May 20, 1930.   M. E. LAYNE   1,759,234
THRUST BEARING ALIGNING METHOD
Original Filed April 5, 1924   5 Sheets-Sheet 1
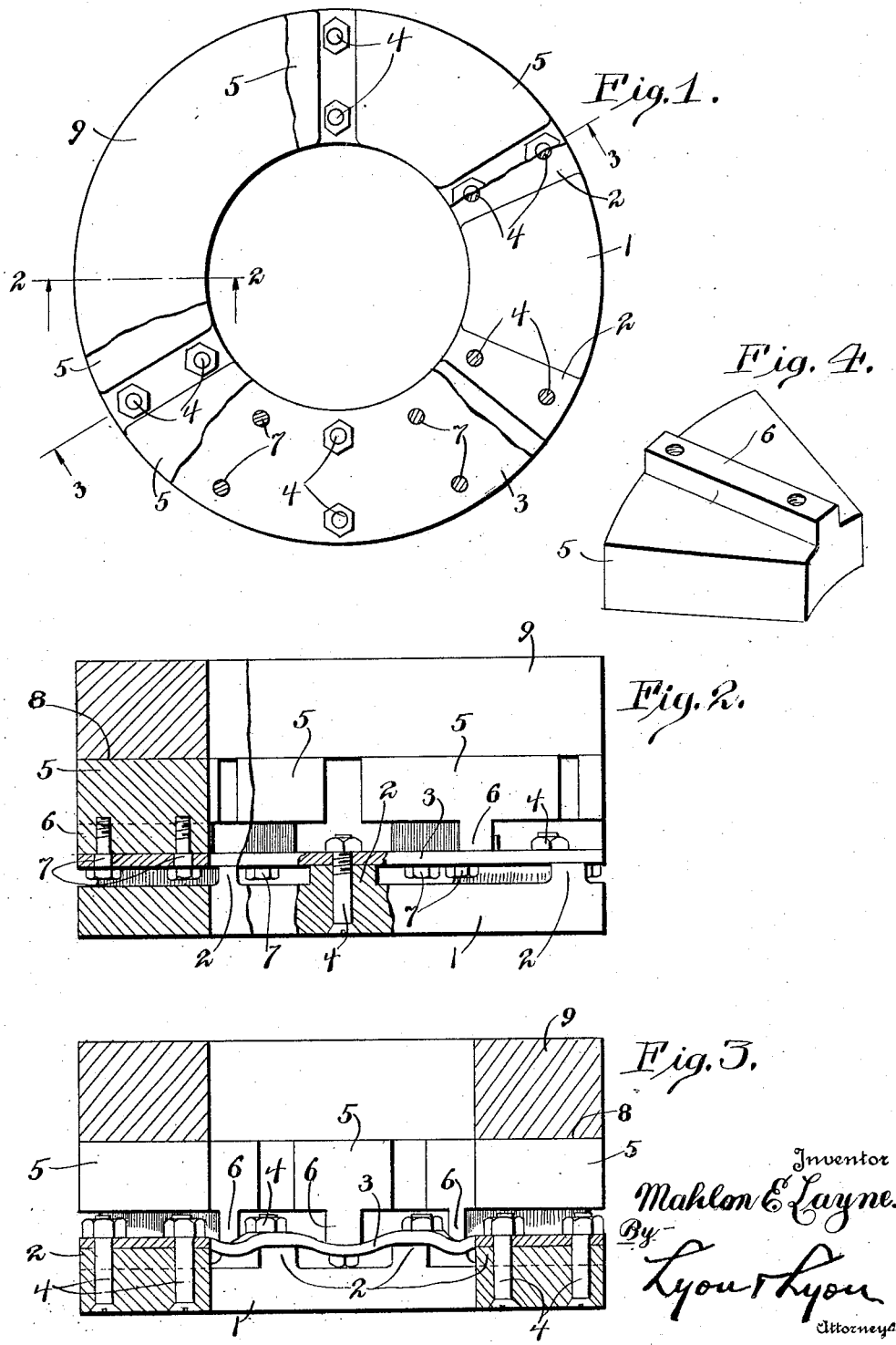

May 20, 1930.   M. E. LAYNE   1,759,234
THRUST BEARING ALIGNING METHOD
Original Filed April 5, 1924   5 Sheets-Sheet 2

Inventor
Mahlon E. Layne.
By Lyon & Lyon
Attorneys

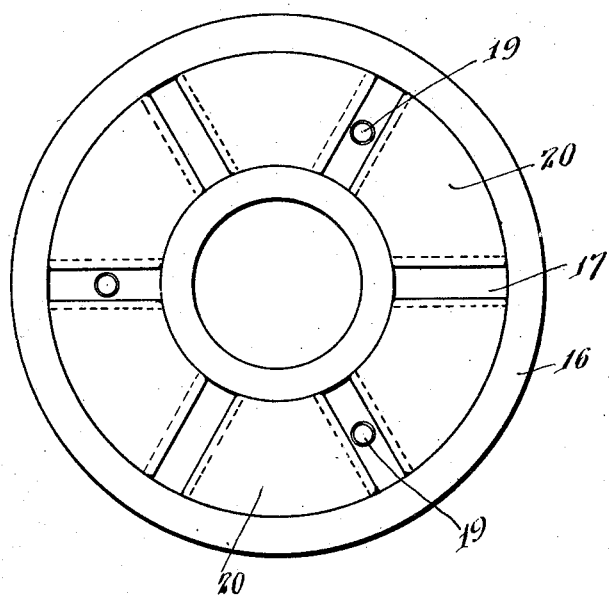
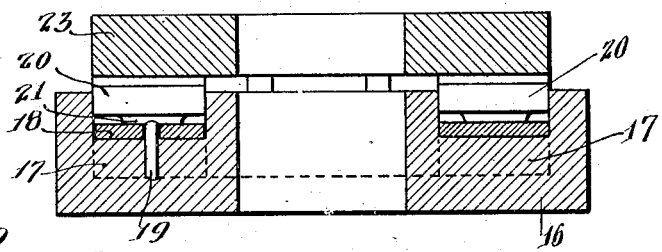
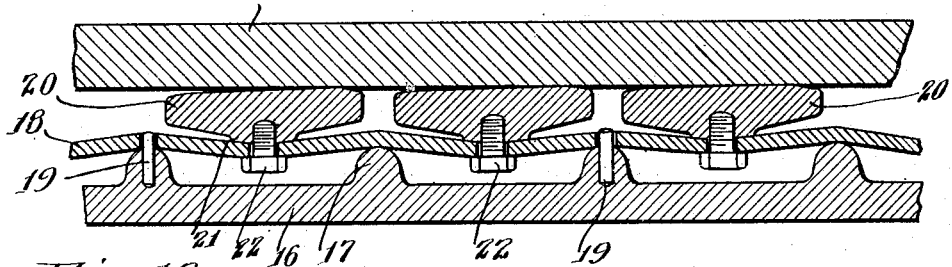
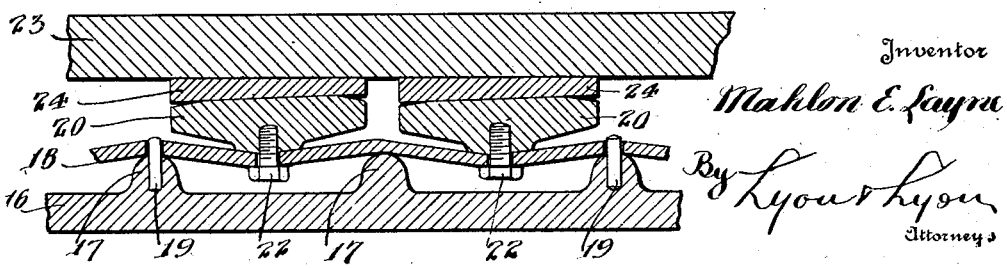

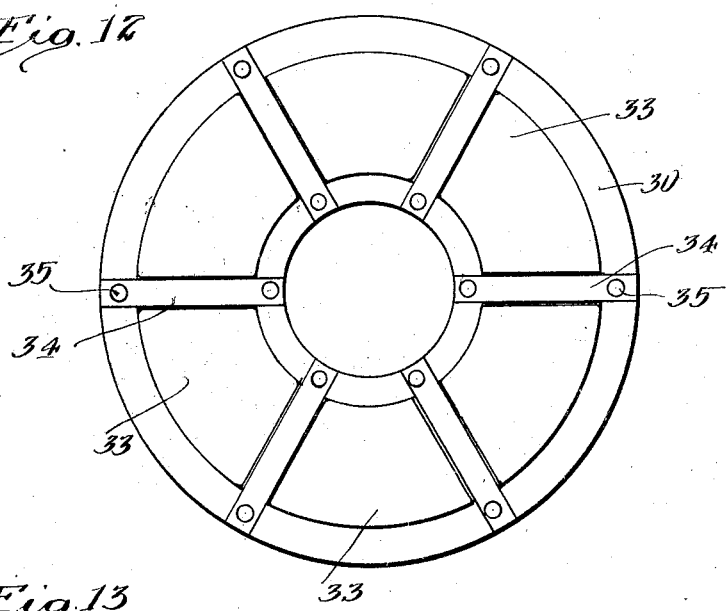
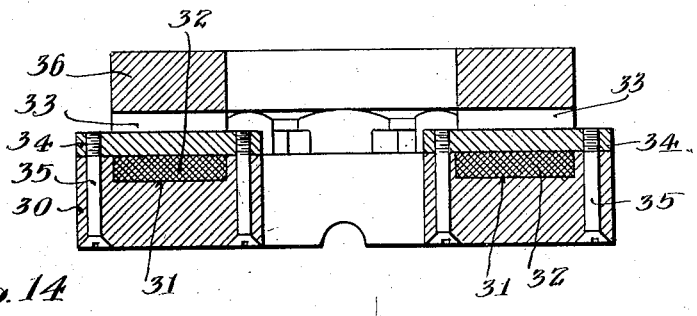
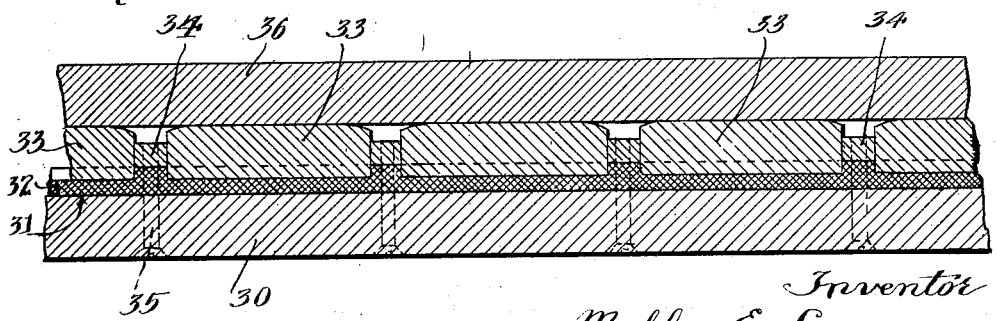

Patented May 20, 1930

1,759,234

UNITED STATES PATENT OFFICE

MAHLON E. LAYNE, OF HOUSTON, TEXAS, ASSIGNOR TO LAYNE & BOWLER CORPORATION, OF LOS ANGELES, CALIFORNIA, A CORPORATION OF CALIFORNIA

THRUST-BEARING-ALIGNING METHOD

Original application filed April 5, 1924, Serial No. 704,387. Divided and this application filed September 8, 1925. Serial No. 55,056.

This invention relates to thrust bearings and to the method of aligning the same, and is particularly directed to heavy duty bearings adapted to sustain relatively heavy loads rotating at relatively high speeds.

This application is a division of my copending application Serial No. 704,387, filed April 5, 1924, for thrust bearing and aligning method.

Heretofore to align the rubbing faces of the bearing members, one of the bearing members, usually the lower member, has been constructed in a plurality of segments which are supported from below and dependent on the lower supporting means to hold the rubbing faces in the proper position to receive the load from the other or upper bearing member. Unless these segmental bearing members or shoes are perfectly constructed and held in perfect position in the bearing, there will be exerted upon one or more of the bearing shoes a greater pressure than is exerted upon the other bearing shoes with the result that the oil film on such bearing shoe or shoes will tend to break down and metal to metal contact exist between the bearing parts, with a resulting high friction and rapid wear upon the bearing members.

The art has heretofore attempted to align these bearing shoes by various means, among which might be mentioned the different types of spring mountings employed for the separate bearing shoes. Both theory and experience has shown, however, that with a spring type of support for the bearing shoes, the pressure on the various bearing shoes cannot be maintained equal, and that the film of lubricant supplied to the different shoes will break down at various points, producing the direct metallic contact between the upper and lower wearing members of the thrust bearing with the resulting undue friction and wear.

While mounting the different segmental shoes on spring supports will permit the upper wearing member of the bearing to force the different segmental shoes into alignment, the upper bearing member of the bearing cannot so force the shoes into alignment without exerting an unequal pressure on one or more of the segmental bearing shoes as the spring support tends to hold or maintain the bearing shoes in their original position.

I have discovered that if, in place of supporting the segmental bearing shoes upon spring or resilient material and depending upon the upper wearing member to force the different segmental bearing shoes down against their resilient supports and thus into alignment, the segmental bearing shoes are mounted upon a material or support which is non-resilient or deformable in nature, the separate segmental bearing shoes may be forced down against such material and be permanently set into alignment and thereafter such a support will not continually apply an unequal pressure to the different bearing shoes and a uniform pressure will be exerted on the wearing surfaces of the bearing.

By this invention I have provided a thrust bearing employing a plurality of segmental bearing shoes which are permanently supported in the requisite position to properly maintain an oil film between the wearing surfaces of the bearing and thus do not yield during the action of the bearing or move out of alignment. Moreover, I am able to provide such a permanently aligned bearing without having to perfectly machine and construct all the parts of the bearing; as will be apparent from the following description of the bearing and the method of aligning and constructing the same.

I have also provided a thrust bearing, which, when the shaft supported upon the bearing is rotated in its intended direction, the oil around the bearing will be forced between the wearing surfaces of the bearing so as to aid in maintaining the desired film of lubricant.

The objects and advantages of this invention will be apparent from a description of the preferred method of aligning the bearings and the thrust bearing so produced contained hereinafter.

In the accompanying drawings I have illustrated the preferred examples of the thrust bearings embodying my invention and have illustrated the method of aligning and producing such bearings.

In the drawings:

Figure 1 is a plan view of a thrust bearing embodying the invention, certain parts being broken away.

Fig. 2 is a side elevation of Fig. 1, the left side of the view being broken away to show the bearing as viewed in section on the line 2—2 of Fig. 1, and the middle portion of the view being broken away to illustrate one of the abutments of the lower part of the bearing.

Fig. 3 is a vertical section taken through the bearing on the line 3—3 of Fig. 1 showing the bearing after the application of a force sufficient to set the bearing in its finished position.

Fig. 4 is a perspective view of a segmental bearing shoe and represents the same in an inverted position.

Fig. 7 is a plan view of a modified form of thrust bearing.

Fig. 8 is a vertical section of the bearing shown in Fig. 7.

Fig. 9 is a developed vertical section of the bearing.

Fig. 10 is a developed vertical section of the means employed for setting the bearing in alignment.

Fig. 12 is a plan view of a further embodiment of the invention.

Fig. 13 is a vertical section of the bearing shown in Fig. 12.

Fig. 14 is a developed vertical section of Fig. 12.

Figure 5:
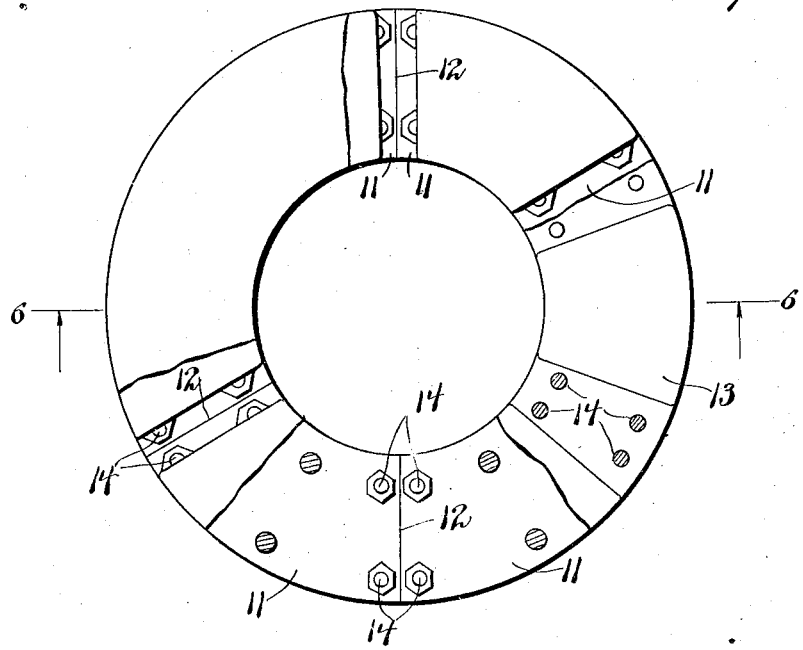
Fig. 5 is a plan view partially broken away of the second embodiment of the invention.

Referring first to the first embodiment of the invention, the thrust bearing includes a stationary base member 1. Said base member 1 is provided on its upper side with a plurality of radially disposed abutments 2 on which rests a suspension plate 3, which in the present instance is in the annular form. This plate 3 should be composed of wrought iron or low carbon steel or similar material which is deformable and of great strength, and which is capable of being permanently set by pressure applied thereto while retaining a relatively high strength. Said plate or ring 3 is preferably secured to the base member 1 by means of bolts 4 passing through the abutments 2. The upper face of these abutments 2 thus operate to support the under face of the annular plate 3 at a plurality of points of radial zones, preferably said zones being disposed equidistant and circumferential about the axis of the bearing. The annular plate 3 being secured by the bolts 4 to the base member 1, said plate is held from rotating during operation of the bearing and the permanent set to be effected in the plate 3 will not be altered by rotating the plate 3 over the abutments 2. It is to be preferred for reasons hereinafter set forth that the holes in the plate 3, through which the bolts 4 pass, should be larger than the diameter of the bolts 4.

Supported on the upper side of the plate 3 is provided a plurality of segmental bearing shoes 5. Said shoes are supported on the upper face of the plate at points, lines or zones disposed intermediate the abutments 2. To support the segmental bearing shoes 5, each segmental shoe 5 is provided with a web 6 of reduced width, each web 6 extending radially with respect to the axis of the bearing. Preferably the segmental bearing shoes 5 are permanently secured to the deformable plate 3 by suitable means such as bolts 7, said bolts serving to prevent the segmental shoes 5 varying their position with respect to the plate 3, which would result in the shoes 5 being carried from the zone of true alignment.

When the deformable plate 3 is secured to the upper face of the abutments 2, it is normally formed of a flat annular plate or ring, but of a material capable of being permanently set or distorted to effect the automatic alignment of the shoes 5. Preferably after the plate 3 and shoes 5 have been put in place, the upper faces or rubbing faces of the segmental bearing shoes should be simultaneously subjected to a pressure sufficient to produce a permanent set in the material of the plate 3 between the abutments, as indicated by the curved form of such plate as shown in Figures 2 and 3. This permanent set or distortion may be produced by means of an object with a true surface resting on the shoes and thrust downwardly with great force. If desired, this pressure may be produced directly by means of the true face 8 of an upper bearing member 9, which should be thrust downwardly with a slightly greater force than the force which the bearing is designed to thereafter receive or support.

In this form of the invention it should be noted that the several segmental bearing shoes 5 are supported in a hammocklike manner upon the continuous deformable support 3. By this construction, if one of the segmental shoes is originally of greater height the remainder, pressure upon the shoes will equalize the position of the shoes, partly by drawing a portion of the plate from the adjacent shoe, thus lowering said elevated shoe and raising the adjacent shoes. This hammock like construction thus facilitates the deformable material in permanently aligning the bearing shoes.

Figure 6:
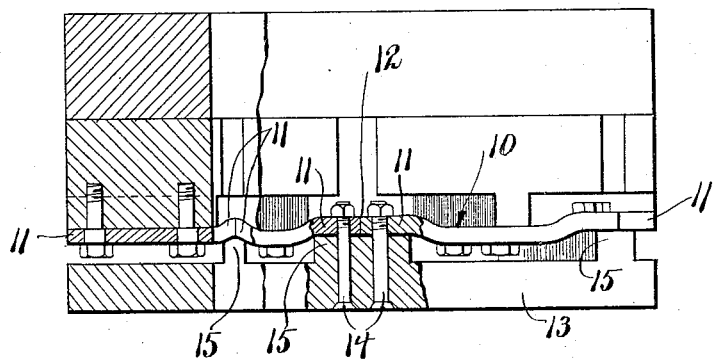
Fig. 6 is a side elevation of Fig. 5 with the left edge view broken away to show the bearing as viewed in section on the line 6—6 of Fig. 5 and the medial portion broken away to illustrate one of the abutments.

In Figures 5 and 6 a modified construction is shown which is somewhat of the same construction as previously described except that a segmental ring 10 is provided corresponding to the previous integral ring 3 of Figures 1 to 4 inclusive. The segments 11 of the ring 10 abut together at points 12. Each end of these segments 11 are secured to abutments 15 carried by an annular base member 13, bolts 14 being used for that purpose.

By this construction the segmental bearing shoes 5 are supported upon a deformable material (the ring 3 or 10) and pressure exerted upon the securing faces of the bearing shoes will tend to permanently set the bearing shoes in alignment, by causing a permanent distortion in the plates 3 or 10. After this permanent set is attained in the plates 3 or 10, there is no tendency of the plates to force the segmental bearing shoes out of alignment as is found in the prior type of spring mounted segmental shoes, but the thrust bearing 3 provided will be maintained in true alignment with equal pressure on each bearing shoe, thus permitting equal lubrication for all bearing surfaces of the bearing and materially eliminate friction and wear.

Referring to the form of the invention shown in Figures 7 to 10, inclusive, the bearing comprises a stationary base member 16. Said base member is provided on its upper side with a plurality of abutments 17 on which rests a suspension plate 18 which in the present instance is annular in form. This plate 18 should be composed of wrought iron or low carbon steel or such material as is relatively deformable and of great strength and which is capable of being permanently set by pressure applied thereto while retaining a relatively high strength. Said plate or ring 18 is preferably secured to the base member 1 by means of pins 19 passing vertically through the center of the abutments 17. The upper face of these abutments 17 thus operate to support the under face of the annular plate 18 at a plurality of points at radial zones with respect to the shaft to be supported on the bearing, preferably said zones being disposed equidistant and circumferential about the axis of the bearing. The annular plate 18 being secured by the pins 19 to the base member 16. Said plate is held from rotation during operation of the bearing and the permanent set to be effected in the plate 18 will not be altered by rotating the plate 18 over the abutments 17. It is preferable that the holes in the plate 18 through which the pins 19 pass should be slightly larger than the diameter of the pins 19.

Supported on the upper side of the plate 18 is provided a plurality of segmental bearing shoes 20. Said shoes are supported on the upper face of the plate at points, lines or zones disposed intermittent the abutment 17. To support the segmental bearing shoes 20, each bearing shoe 20 is provided with a web 21 of reduced width, each web 21 extending radially with respect to the axis of the bearing. Preferably the segmental bearing shoes 20 are permanently secured to the deformable plate 18 by suitable means, such as bolts 22, said bolts serving to prevent the segmental shoes 20 varying their position with respect to the plate 18, which would result in the shoes 20 being carried from the zone of true alignment.

When the deformable plate 18 is secured to the upper face of the abutments 17, it is normally formed of a flat annular plate or ring, but of a material capable of being permanently set or distorted to effect the automatic alignment of the shoes 20. After the plate 18 and shoes 20 have been put in place, the shoes 20 are simultaneously subjected to a pressure sufficient to produce a permanent set in the material of the plate 18 between the abutments, such permanent set being indicated by the curved form of such plate as shown in Figures 9 and 10. In this embodiment of the invention, the wearing face of each bearing shoe 20 is set at a slight angle to the face of the co-acting bearing member such as is indicated by the part 23, the object of this slight angle being to assist the oil entering the space between the part 23 and bearing shoes 20, so as to increase the oil film therebetween. This permanent set of the shoes 20 may be produced by means of angled blocks 24, which are pressed downwardly by an object with a true surface resting on the angled blocks 24 and thrust vertically downward with great force. The force should be greater than the force which the bearing is designed to thereafter receive or support so that after the application of such force, the bearing shoes 20 will be held unyielding in the desired aligned position.

As in the previous embodiment of the invention, is will be noted that the several bearing shoes 20 are supported in a hammock-like manner upon the deformable support 18. This hammock-like construction facilitates the setting of the deformable plate 18 in the permanently set position.

Figure 11:
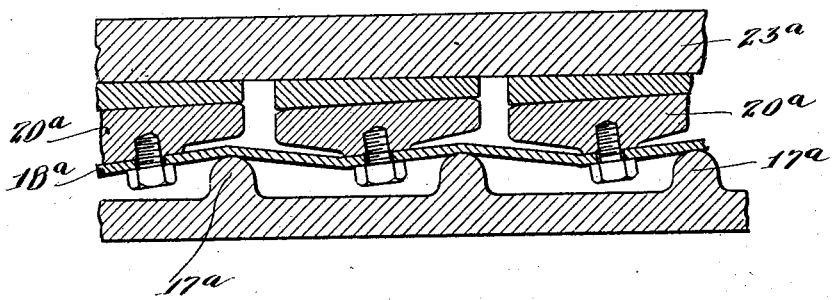
Fig. 11 is a developed vertical section of a modified form of bearing also showing the bearing in the process of alignment.
Figure 15:
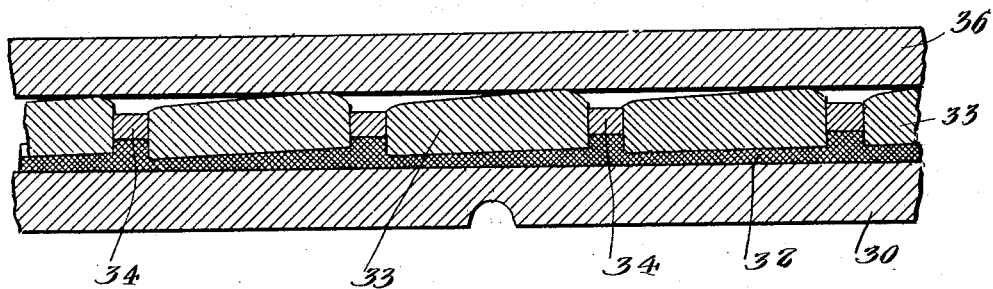
Fig. 15 is a developed vertical section of the bearing set in somewhat different position.

In place of supporting the bearing shoes mid-way between the adjacent abutments they may be set as shown in Figure 11, in which the bearing shoes 20$^a$ are supported closer to the abutments 17$^a$ adjacent the side of the bearing shoe 20$^a$, which is to be set in the higher position. Such a mounting for the bearing will permit the ring 18$^a$ to offer a greater resistance to the depression of the high side of the bearing shoe 20ª than to the depression of the lower side of the bearing shoe 20ª and thus supplement the natural tendency of the plate 18ª to hold the bearing shoes in their desired tilted position. It should be pointed out that the angle or tilt of the bearing shoes in this and the preceding embodiment of the invention is somewhat exaggerated as in actual construction the tilt is very slight.

Now referring to the form of the invention shown in Figures 12 to 15, inclusive. The thrust bearing there disclosed comprises a base member 30, which is preferably annular or ring form and provided with an annular flat bottom recess 31 in its upper face. The bottom of this recess 31 receives a quantity of deformable material 32 which is preferably lead or similar material.

Segmental bearing shoes 33 are supported upon the mat of deformable material 32, said bearing shoes being shaped to fit the inner and outer walls of the recess 31, the walls thus serving to retain the bearing shoes on the mat 32. The upper surface of the shoes 33, together constitute the lower wearing surface of the bearing. The shoes 33 are spaced somewhat apart on the base member 30 and between the adjacent shoes a bar 34 extends radially with respect to the axis of the bearing, such bars 34 being held down on the base 30 by suitable means such as the pins 35. The bars 34 are intended to entirely cover the mat 32 between the adjacent bearing shoes. In use the bearing has the customary upper bearing member 36.

Figure 16:
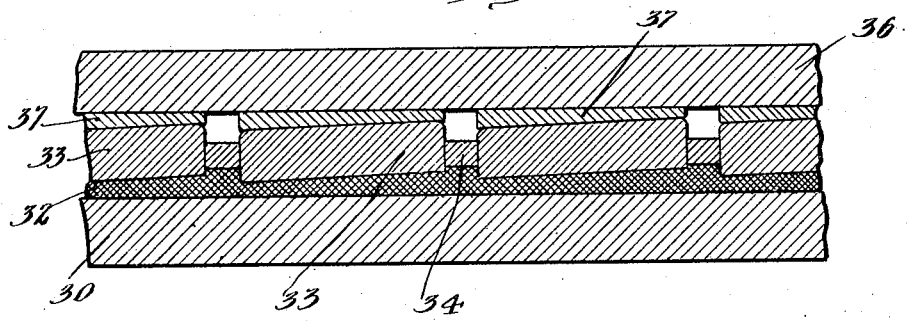
Fig. 16 is a developed vertical section of the bearing showing the method of setting the bearing in the position shown in Fig. 15.

This form of the invention may have its bearing shoes 33 permanently set in alignment by either of the processes shown in connection with the previous embodiment of the invention—that is all the bearing shoes 33 may be subjected simultaneously to a force exerted in an axial direction, which force is substantially greater than the force to which the bearing shoes are designed to thereafter receive. This force may be exerted from an object having a true surface so that all the shoes have their wearing faces aligned as in Figure 14 or they may be pressed downward by angled blocks such as 37 shown in Figure 16 to provide a slight tilt to the wearing surfaces of the bearings in order to enable the lubricant to better find its way between the wearing surfaces of the bearing. In either case the mat 32 will be placed firmly around the bottom of the shoes 33 and up between the space between the shoes, being held from escaping by the bars 34.

By this construction the bearing shoes are held as in the previous embodiments of the invention in permanent aligned position so that the desired oil film may be retained between the bearing faces.

It is understood that the embodiments of the invention herein described may be modified in various manners without departing from the spirit of the invention.

The invention is not limited to the details of construction of the embodiments of the invention shown, but is of the scope set forth in the appended claims.

What I claim is:

1. A method of aligning bearings that comprise a base, a body of resistant deformable material on the base, and thrust bearing segmental shoes supported on the deformable material, which method consists in, before use of the bearing, applying pressure in substantial excess of the working load of the bearing to all of said shoes simultaneously through the medium of a member having a surface placed against the surface of the shoes, whereby the bearing surfaces of the shoes are all positioned in substantial alignment.

2. A method of aligning bearings that comprise a base, a body of resistant deformable material on the base, and thrust bearing segmental shoes supported on the deformable material, which method consists in, before use of the bearing, applying an overload to all of said shoes simultaneously through the medium of a rigid member having a surface corresponding to the desired surface of the segmental shoes whereby the bearing surface of the segmental shoes are all positioned in proper place, the pressure being applied until the bearing shoes will be maintained in said position by the resistant deformable body in absence of load upon the bearing.

3. A method of aligning bearings that comprise a base, a body of resistant deformable material on the base, and thrust bearing segmental shoes supported on the deformable material, which method consists of applying pressure in excess of the working load of the bearing to all of said segmental shoes simultaneously through the medium of a rigid member having angled plain surfaces placed against the surfaces of the shoes, whereby the bearing surfaces of the shoes are all positioned substantially in a common plane but each at a similar slight angle to said plane, the pressure being applied so that the deformable member is deformed into a position where it will maintain the bearing shoes in the desired position even in absence of a load upon the shoes.

4. A method of aligning bearings that comprise a base, a body of resistant deformable material on the base, and thrust bearing segmental shoes supported on the deformable material, which method consists of applying an overload to all of said segmental shoes simultaneously through the medium of a rigid member having angled plain surfaces placed against the surface of the shoes, whereby the bearing surface of the shoes are all positioned substantially in a common plane but each at a similar slight angle to said plane, the pressure being applied so that the deformable member is deformed into a position where it will maintain the bearing shoes in the desired position even in absence of a load upon the shoes.

5. A method of aligning bearings that comprise a base having spaced supporting abutments, a bridge member of resistant deformable material on the supporting abutments, and bearing shoes attached to the bridge member at points between the abutments, which method consists of applying a pressure in excess of the working load of the bearing to all of the bearing shoes simultaneously through the medium of a rigid member having a plain surface shaped to correspond to the surface to which the surface of the bearing shoes are desired to conform, whereby the bearing surfaces of the shoes are all forced into their desired position while said resistant deformable bridge member is bent down between adjacent abutments and permanently set so that the bridge member is capable of holding the bearing shoes in their desired position with or without load upon the bearing shoes.

6. A method of aligning bearings that comprise a base having spaced supporting abutments, a bridge member of resistant deformable material on the supporting abutments, and bearing shoes attached to the bridge member at points between the abutments, which method consists of applying an overload to all of the bearing shoes simultaneously through the medium of a rigid member having a plain surface shaped to correspond to the surface to which the surface of the bearing shoes are desired to conform, whereby the bearing surfaces of the shoes are all forced into their desired position while said resistant deformable bridge member is bent down between adjacent abutments and permanently set so that the bridge member is capable of holding the bearing shoes in their desired position with or without load upon the bearing shoes.

Signed at Los Angeles, Cal., this 21st day of August, 1925.

MAHLON E. LAYNE.